(12) United States Patent
Harold

(10) Patent No.: US 12,062,043 B1
(45) Date of Patent: *Aug. 13, 2024

(54) TIME-SEQUENCED, ASYNCHRONOUS BYZANTINE FAULT TOLERANT CONSENSUS FOR DISTRIBUTED LEDGER

(71) Applicant: GoKnown LLC, Shreveport, LA (US)

(72) Inventor: Michael D. Harold, Shreveport, LA (US)

(73) Assignee: GoKnown LLC, Shreveport, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,812

(22) Filed: Jan. 29, 2024

Related U.S. Application Data

(63) Continuation-in-part of application No. 17/897,901, filed on Aug. 29, 2022, now Pat. No. 11,886,463, which is a continuation-in-part of application No. 17/537,125, filed on Nov. 29, 2021, now Pat. No. 11,477,022, which is a continuation-in-part of application No. 16/993,038, filed on Aug. 13, 2020, now Pat. No. 11,188,523.

(60) Provisional application No. 62/888,011, filed on Aug. 16, 2019.

(51) Int. Cl.
   *G06Q 20/40* (2012.01)
   *G06Q 20/38* (2012.01)

(52) U.S. Cl.
   CPC ..... *G06Q 20/401* (2013.01); *G06Q 20/38215* (2013.01)

(58) Field of Classification Search
   None
   See application file for complete search history.

(56) References Cited

U.S. PATENT DOCUMENTS

| | | | |
|---|---|---|---|
| 10,623,173 B1 | 4/2020 | Geng et al. | |
| 2018/0089641 A1* | 3/2018 | Chan | G06Q 40/06 |
| 2019/0026146 A1 | 1/2019 | Peffers et al. | |
| 2019/0050856 A1* | 2/2019 | Vintila | H04L 9/50 |
| 2019/0208422 A1 | 7/2019 | Haleem et al. | |
| 2020/0186607 A1 | 6/2020 | Murphy et al. | |
| 2020/0328886 A1 | 10/2020 | Newton et al. | |
| 2021/0019429 A1 | 1/2021 | Cooner | |
| 2022/0138640 A1* | 5/2022 | Augustine | G06F 16/27 |
| | | | 705/5 |

\* cited by examiner

*Primary Examiner* — Eddy Cheung
(74) *Attorney, Agent, or Firm* — St. Onge Steward Johnston & Reens LLC; Stephen P. McNamara

(57) ABSTRACT

A system for processing distributed ledger transactions using a time-sequenced, asynchronous, Byzantine Fault Tolerant (taBFT) consensus system. Transaction data from a client device is received by a full node in a distributed ledger network. The full nodes are preferably satellite based nodes. The full nodes include an object router and a validator node. Transaction data is received at the object router, a timestamp is attached to the transaction data, and the combined data is encrypted and sent to the validator node, and also to other full nodes. The validator node verifies the format, structure and correctness of the data contained in the transaction, and validates the requested transaction. Other full nodes receive the encrypted transaction data and make their own determination of the validity of the transaction data. Upon consensus approval of a transaction, the transaction data is executed and submitted to a permanent data store.

21 Claims, 3 Drawing Sheets

TIME-SEQUENCED, ASYNCHRONOUS BYZANTINE FAULT TOLERANT CONSENSUS FOR DISTRIBUTED LEDGER

FIELD OF THE INVENTION

The present invention relates generally to methods for electronically receiving and transmitting distributed ledger transactions and messages between and among a multiplicity of computing nodes in a distributed ledger network.

BACKGROUND OF THE INVENTION

In an increasingly globalized economy in which transactions are required to traverse both public and private networks of individuals, corporations, national boundaries and continents at speeds and volumes that continue to increase by orders of magnitude, distributed ledgers and their associated blockchain technologies have emerged as a preferred solution. In 2008, Satoshi Nakamoto published the Bitcoin White Paper which described a decentralized, distributed, peer-to-peer, public network of nodes able to provide secure, anonymous, automated payment services between two parties. On Jan. 3, 2009 the bitcoin network became operational when Satoshi Nakamoto mined the genesis (i.e., first) block of bitcoin. One of the key features of the system was and remains the ability to incentivize operators of the nodes by providing them a means to acquire bitcoin currency by being the first to mine (i.e., process) transactions in groups or "blocks" of transactions. Each group of transactions and each transaction within each block is linked together using a one-way cryptographic function that converts plain text to a unique fixed-length text message called a hash. Since there is no way to reverse the hash process to recover the original text, these hashes are used to immutably link all of the transactions processed by the distributed ledger beginning with the first transaction. Because the hashing process is computationally intensive, block mining typically consists of solving a hashing problem of predetermined complexity in order to receive credit for mining the next block in the chain. The creation of a new block requires the approval of other nodes on the network, each of which has a complete and identical copy of the blockchain/ledger record beginning with the first transaction and continuing to the most recent block. This voting approval process makes it difficult to alter completed transactions without the alteration being discovered by the other nodes, greatly increasing the security of the system and the integrity of its data.

The computationally intensive nature of the block mining process results in a slower operation of the system than would be possible without block mining. Since transactions are completed in blocks of multiple transactions and since no new group of transactions can be considered completed until the most recent block is recorded, each block in the ledger is essentially a "tick" of the blockchain clock. This "tick" of the blockchain clock is an implicit yet distinct function, separate and apart in purpose from the operator incentive which is block mining. Since the original bitcoin ledger was implemented in 2009, new distributed ledger and blockchain architectures have proliferated. Initially, the majority of distributed ledger implementations continued to provide similar incentives for block mining. Recently, a change from proof-of-work (PoW) block processing to proof-of-stake (POS) block processing has resulted in a moderate increase in transaction speeds and volumes. In both cases, transactions continue to be processed in blocks. From a transaction processing point of view, block mining is a batch process. This has proven a major impediment to increasing the speed and transactional throughput of blockchain technology.

Byzantine Fault Tolerance methods have been developed as a consensus mechanism which replaces batches process with individual transactions processed in time order across the network. Such methods provide faster, higher throughput of database processing. Byzantine Fault Tolerant consensus requires that each node in a distributed ledger network independently process each transaction and vote "YES" or "NO" on the correctness of the resulting transaction data. Several very large public blockchain networks having thousands of participating nodes use a fifty-one percent "YES" consensus threshold to approve new transactions. Normally, in most private blockchain implementations, only those transactions that pass the vote with a sixty-six percent or greater consensus from all voting nodes are added to the immutable ledger. Conversely, transactions that do not pass the sixty-six percent vote threshold are not added to the ledger.

None of the presently known methods of distributed ledger transaction processing, however, are able to provide highly secure and scalable transactions while at the same time providing all of the important key features of the underlying blockchain technology which include immutability, decentralization, consensus, security and automation. Specifically, the prior art fails to demonstrate any system or method in which a client computer initiates and communicates a distributed ledger transaction, smart contract or data, hereinafter referred to collectively as "transaction", to an individual node in a network of distributed ledger nodes or to the network itself, which transaction is labeled with a timestamp which is able to accurately preserve its time order and first-in, first-out (i.e., FIFO) position across all nodes in the network, each of which nodes may also receive and process incoming transactions in like manner. Additionally, the prior art fails to describe a consensus protocol that requires each node in the distributed ledger network to independently verify the correctness of each transaction and the time order in which it was received and to communicate its vote to all other voting nodes, each of which is also required to independently tally the total votes to reach a "YES" or "NO" consensus on whether or not a transaction will be added to the distributed ledger's immutable record.

There is, therefore, a present need to provide an improved system and method for managing distributed ledger transactions that overcomes the aforementioned constraints.

SUMMARY OF THE INVENTION

A time-sequenced, asynchronous, Byzantine Fault Tolerant (i.e. taBFT) consensus system and method can be used to guarantee the time order, data integrity and transactional integrity of each and every transaction processed by the distributed ledger network in which a client initiates and communicates a distributed ledger transaction data record or records to an individual node in a network of distributed ledger nodes or to the network itself, which transaction is first labeled with a both a timestamp and a cryptographic hash generated from a combination of the timestamp and the transaction data record or records. The timestamp, cryptographic hash and transaction data is then encrypted using quantum event generated random binary digits and then securely transmitted to the other ledger nodes in the network using a quantum safe encryption protocol. This allows the highly secure and time ordered communication of all transactions and transaction-related messages to the system with minimal risk of collision, race conditions or communications related security breaches.

In contrast to the traditional distributed ledger transaction processing model, the present invention permits the secure and rapid transfer of individual transactions among multiple distributed ledger nodes in a network. To accomplish this, the present invention combines the time ordering of transactions as they are received in real or near-real time, the secure communications of those transactions between ledger nodes, the minimization of network latencies associated with each transaction and the minimization of server and network operating costs associated with each transaction. The present invention is accordingly designed for use as a hardware and software system, method and apparatus capable of transmitting and receiving high volumes of distributed ledger transactions in an automated, peer-to-peer, replicated and decentralized computing environment.

Specifically, the decentralized computing environment has as one of its key features a guarantee of first in, first out FIFO transaction processing that removes the need for traditional block-based transaction processing. This is made possible through the use of a timestamp and a hash which is added to each new incoming transaction at the point at which it enters the network. This operation maintains the time order among all transactions being processed by all ledger nodes in the network. In a 1 Gbps network, this translates to thousands of distributed ledger transactions per second. Higher bandwidth capacity (e.g., 10 Gbps, 100 Gbps, etc.) provides a commensurably higher rate of message transmission, particularly where large digital files are involved, thereby reducing the overall latency of the network. Another feature is the encryption of each transaction message between ledger nodes. A further feature is the ability to use the present invention to create distributed ledger networks that receive data or attributes from blockchains, secure data stores, decentralized exchanges, or immutable, general purpose distributed databases.

Each full node in the distributed ledger network independently communicates, verifies, computes, votes and stores incoming transactions in time order and reports its results to the other nodes using a cybersecure wireless and/or wireline communication protocol. The Internet Protocol (IP) address of each full node in the distributed ledger network is maintained within a private IP address table maintained by each object router and accessible only by the object router and its associated full node.

Low Earth Orbit (LEO) satellite networks reduce the communication latencies between ground-based data senders and receivers, in some cases making the use of LEO satellite communications faster than fiber-optic, ground-based communications. The use of ultra reliable, low latency laser communications between satellites positioned in Low Earth Orbit greatly increases both the number of messages that can be transmitted in a given period of time as well as the amount of data that can be transmitted between two satellites.

In accordance with one embodiment of the invention, a method for processing distributed ledger transactions and a decentralized distributed ledger system includes the following system and methods: Initiating a distributed ledger transaction using a client device in electronic communication with a distributed ledger network; receiving the transaction by a full node in the distributed ledger network, specifically the object router associated with the full node; the object router in the full node, upon receiving the transaction, generating timestamp data for the transaction, the timestamp data derived from a network time signal, or being obtained or derived from a network time signal; the object router prepending the timestamp to the input data, encrypting the resulting message and communicating the encrypted timestamp and input data to all other full nodes, specifically each full node's object router; transferring control of the data from the object router to its associated validator node; each validator node processing the transaction by verifying the format, structure and correctness of the data contained in the transaction; each validator node performing all application and/or other logic associated with the transaction using the input data to create the transaction's output data; each validator node using the taBFT consensus protocol to determine whether or not the transaction is valid, concatenating the original timestamp, the input data and the output data and using the result to create a cryptographic hash; the validator node prepending a "YES" or "NO" vote to the cryptographic hash; the validator node communicating the resulting message to the associated object router; the object router in turn prepending a timestamp to the message; the object router compressing, encrypting and communicating the message to all other full node object routers in the distributed ledger network; each validator node's taBFT service maintaining a table or matrix of transaction values indexed in time order using the original timestamp of the transaction; each taBFT service maintaining a list of "YES" and "NO" votes for each transaction in process; each taBFT service counting the votes for each transaction as they are received from other voting nodes in the network; each taBFT service, upon approval of a transaction, submitting the transaction data, including it's Merkle Trie hash value and original timestamp value to the data store service responsible for maintaining that full node's immutable ledger record of all cryptographically linked transactions.

In accordance with another embodiment of the invention, a method for processing distributed ledger transactions using a decentralized distributed ledger network of satellites in Low Earth Orbit able to communicate with terrestrial and aviation devices using satellite communications communications and able to communicate with other satellites in the network using ultra reliable, low latency laser communications is provided.

It is, accordingly, an object of the present invention to set forth an improved system and method for distributed ledger transaction processing.

It is another object of the present invention to provide a system, method and apparatus able to maximize the speed and throughput of distributed ledger transactions.

It is a further object of the present invention to provide a system, method and apparatus by which transactions can be securely transmitted using multiple encryption methods that include public keys, private keys and nonces composed wholly or in part of quantum event based random binary digits.

It is a further object of the present invention to provide a system, method and apparatus able to create an edge computing network using 5G wireless communications as a means of placing the routing, logic and messaging components of a distributed ledger network node in close proximity to the client devices originating transactions.

It is a further object of the present invention to enable the creation of a distributed ledger using handheld wireless devices, including smartphones and Internet of Things (IOT) devices, as distributed ledger nodes in a network.

It is a further object of the present invention to provide a system, method and apparatus that is able to transmit transaction-related messages between ledger nodes in a distributed ledger network using the same systems and methods as those used to transmit the original transactions.

It is a further object of the present invention to provide a system, method and apparatus able to create a distributed ledger computing network in Low Earth Orbit or LEO using wireless radio and optical communications as a means of minimizing communications latencies by placing the routing, logic and messaging components of a distributed ledger network node in close proximity to the client devices originating transactions.

It is a further object of the present invention to guarantee the accuracy, integrity and cybersecurity of each transaction's input and output data by using a time-sequenced, asynchronous Byzantine Fault Tolerant (taBFT) protocol able to process transactions in real time at scale.

BRIEF DESCRIPTION OF THE DRAWINGS

A more complete understanding of the system, method and apparatus of the present invention may be obtained by reference to the following Detailed Description when taken in conjunction with the accompanying Drawings.

DETAILED DESCRIPTION OF THE INVENTION

The disclosures of my U.S. Pat. Nos. 11,188,523; 11,477,022; 11,886,463; 9,830,467; 10,467,425; 11,106,814; 11,423,169; 8,620,207; 9,351,138; and 10,728,296 are hereby incorporated by reference.

Figure 1:
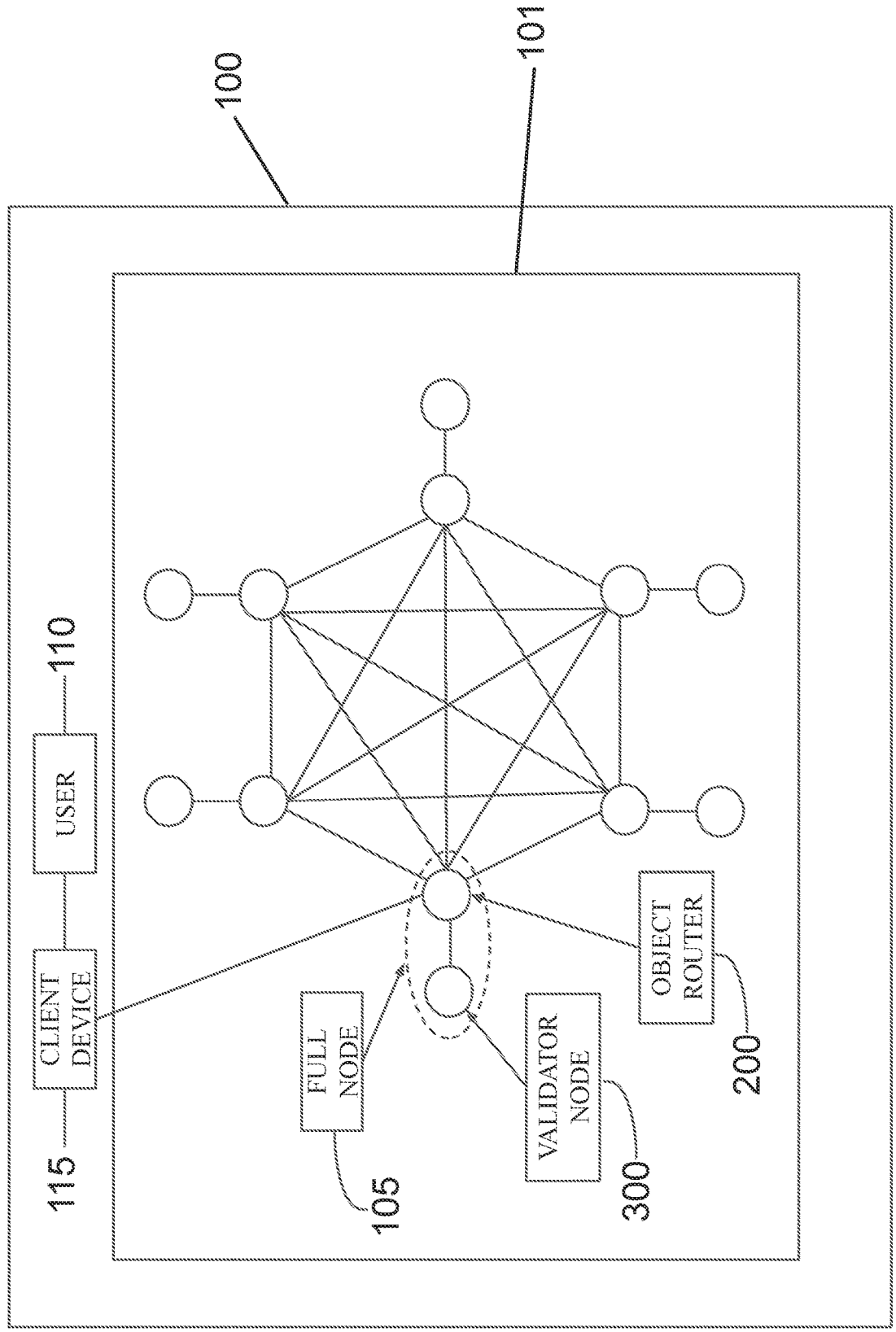
FIG. 1 illustrates a topology of a distributed ledger network consisting of six full nodes in which each full node consists of a distributed ledger object router and a validator node.

With reference now to FIG. 1 of the Drawings, there is illustrated therein a first embodiment for practicing the principles of the present invention, which operates within a distributed communications network, generally designated by the reference numeral 100. In particular, a user 110 of the network 100 uses any of a variety of client devices, including a desktop, laptop, tablet, smartphone, or any other personal computing wireline or wireless computing device or, alternatively, a server computer located on-site, in a data center, in a 5G edge cloud or other private or public cloud, generally designated by the reference number 115, that has as part of its function the ability to initiate and/or participate in multi-party transactions over the network. As shown in the figure, the user 110 uses said client device 115 to initiate a transaction with a distributed ledger object router 200 contained within a full node 105, the full node contained within the distributed ledger network 101, the distributed ledger network 101 itself accessed through the network 100 containing the client device 115. In the present example, the distributed ledger object router 200 communicates directly with its associated distributed ledger validator node 300 and all of the other object routers contained in the distributed ledger network 101. A distributed ledger validator node 300 is distinct from other types of distributed ledger nodes in that it is the only type of node able to participate in consensus voting. A distributed ledger validator node 300 is responsible for verifying, voting on and maintaining an immutable record of all transactions validated by the distributed ledger. This requires that all distributed ledger object routers 200 and distributed ledger validator nodes 300 in the distributed ledger network 101 must use the same type of device or devices and method or methods to process transactions.

Figure 2:
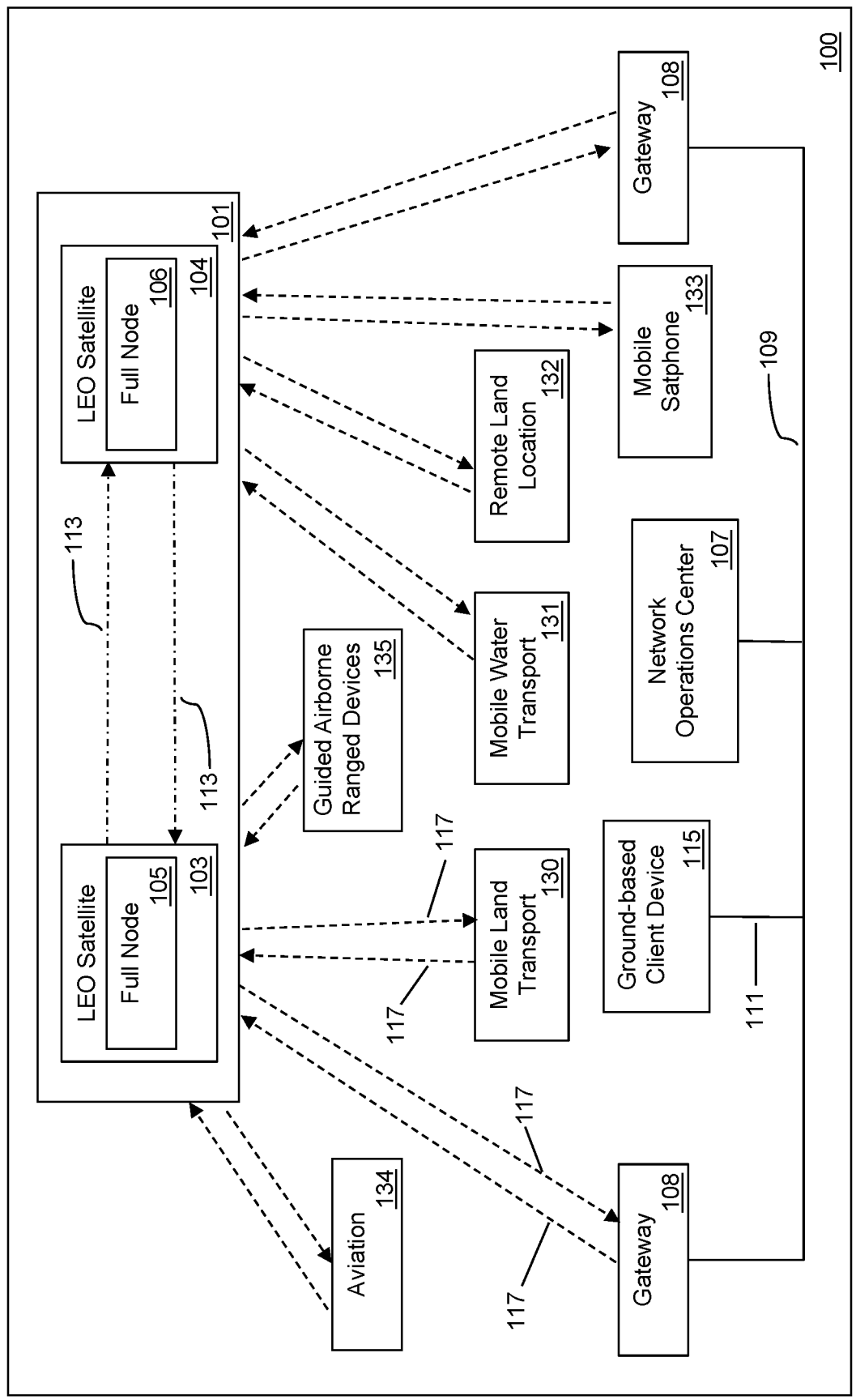
FIG. 2 illustrates a topology of a distributed ledger satellite network able to communicate with ground, water and air-based devices using satellite communications in combination with fiber and cable communications lines and with other satellites in its network using laser-based, optical communications.

With reference now to FIG. 2, there is illustrated therein an embodiment for practicing the principles of the present invention, which operates within a distributed ledger network 101, itself contained within a distributed communications network, generally designated by the reference numeral 100. The two full nodes 105,106 shown in the distributed ledger network 101 are representative of all the nodes in the distributed ledger network 101. In practice, the number of nodes may vary in number beginning with a minimum of three which is the minimum number of nodes required to provide a 66% consensus voting majority for all Byzantine Fault Tolerant protocols and implementations. Desirably, full nodes 105,106 are located in a Low Earth Orbit (LEO) satellite.

Ground-based client devices 115 include but are not limited to smartphones, satphones, satphone-enabled smartphones, IoT (i.e., Internet of Things) sensing and recording devices, personal computing devices such as tablets, portable PCs, desktop PCs and any other personal computing wireline or wireless computing device or, alternatively, a server computer located on-site, in a data center, in a 5G edge network or any other private or public network.

As shown in FIG. 2, client devices 115 with access to wireless satellite communications 117 modalities may communicate directly with the distributed ledger object router 200, 201 contained in full node 105, 106, located within a Low Earth Orbit (LEO) satellite 103, 104. Wireless satellite communications 117 modalities may include radio communications, optical communications such as laser communications, or microwave communications.

Desirably, a majority (or a percentage that is required for a consensus approval of transaction data) of the full nodes 105,106 in the distributed ledger network 101 are space based, in Low Earth Orbit (LEO) satellite 103, 104. Such positioning of full nodes 105, 106 provide enhanced speed of transaction processing in a global network.

Client devices 115 without direct access to wireless satellite communications 117 communicate through a ground-based wireline and/or wireless network connection 111, in turn connected to a ground-based communications wired network 109 controlled by a ground-based network operations center 107. The communications network 109 transmits and receives data through a ground-based signal gateway 107, 108 (radio, microwave or laser) able to communicate directly with one or more full nodes 105, 106, each full node located within a Low Earth Orbit (LEO) satellite 103, 104.

The full nodes 105, 106 are capable of performing data computation and storage operations prior to retransmitting the data via a same or different ground-based gateway 108 and from there to a ground-based network wired 109, or alternatively via wireless 117 satellite communications to its final destination or destinations. The final destination may for example be a client device 115, mobile land transport 130, mobile water transport 131, remote land locations 132, mobile satphones and satphone-enabled smartphones 133, planes, helicopters, drones and other means of aviation 134 and guided airborne ranged devices such as missiles and rockets 135.

Mobile satphones 133 are able to communicate directly with LEO satellites 103,104 to send and receive data with other satphones 133 and with ground-based client devices 115 using a combination of wireless communications 117, gateways 108 and wireline communications 109.

Rural and other geographically remote land locations 132 may use satellite communications signals 117 to connect and to send and receive data by communicating directly with LEO satellites 103,104. This provides Internet communications to primarily stationary locations that have no connections to traditional fiber optic and cable Internet providers.

Aviation 134 includes airplanes, rotorcraft (e.g., helicopters, gyro-planes, drones), gliders and lighter than air mobile mechanisms (airships, balloons), all of which use satellite communications signals 117 to connect and communicate with LEO satellites 103,104 and, via ground-based gateways 108, with ground-based network operations centers 107 (e.g., airport control towers).

Mobile land transport 130, includes any computing and wireless device embedded or made a part of any mobile land transport including two, three and four wheeled passenger vehicles, buses, semi-tractor-trailers, trains and other types of land-based vehicles used for the transport of people and/or goods.

Mobile water transport 131 includes both surface transport such as personal watercraft, passenger ships, barges, cargo ships, military ships and below surface transport such as submarines and submersibles. Surface-based mobile water transport 131 relies on satellite communications signals 117 for communications. Below-surface mobile water transports such as submarines use acoustic speakers and underwater laser communications, individually or in combination to send and receive signals to and from the surface where they are converted into satellite communications signals 117.

Guided airborne ranged devices 135, which consist mostly of rockets and missiles, communicate with other airborne devices and, via air and ground-based gateways 108, with ground-based network operations centers 107 (e.g., military command and control centers).

Mobile land transport 130, mobile water transport 131, remote land locations 133, satphones 133, aviation 134 and guided airborne ranged devices 135 may communicate with each other and with ground devices using a combination of direct to satellite 117 and ground communications 109 via one or more ground-based satellite communications signal gateways 108.

Alternatively, mobile land transports 130, mobile water transports 131, rural and other geographically remote land locations 132, satphones 133, planes, helicopters, drones and other means of aviation 134 and guided airborne ranged devices such as missiles and rockets 135 may transmit data to and receive data from each other by communicating wirelessly 117 with one or more full nodes 105, 106, each full node contained within a LEO satellite 103, 104, said full nodes 105,106 capable of performing data computation and storage operations prior to directly transmitting the resulting data using satellite communications signals 117 to one or more mobile land transports 130, mobile water transports 131, rural and other geographically remote land locations 132, planes, helicopters, drones and other means of aviation 133 and guided airborne ranged devices such as missiles and rockets 134.

Figure 3:
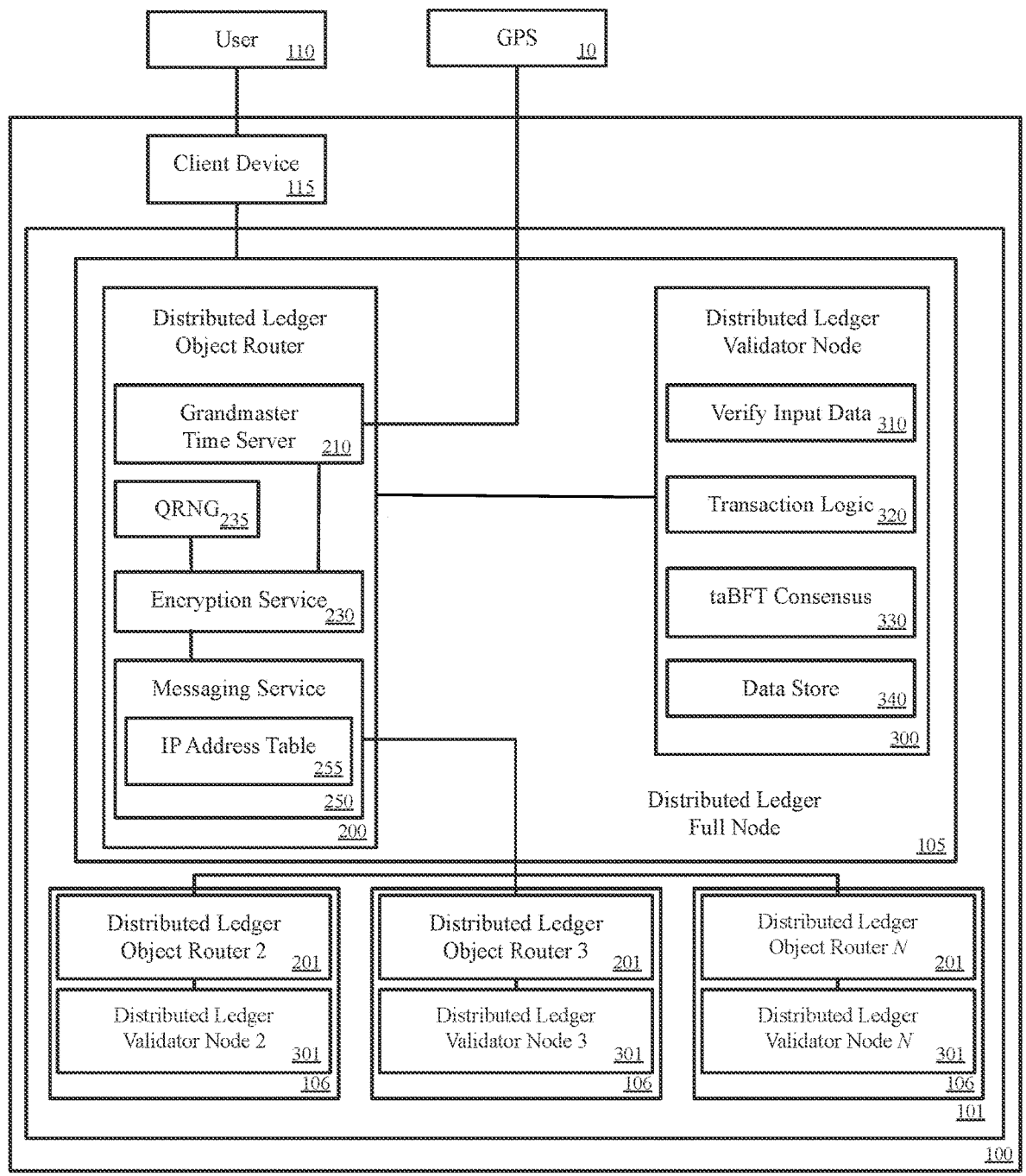
FIG. 3 illustrates the operation of a distributed ledger object router having a private IP address table and its associated distributed ledger validator node with a second distributed ledger object router and validator node to time-stamp, encrypt, securely communicate, verify, compute, vote and store incoming transactions processed by the distributed ledger network using a time-sequenced, asynchronous Byzantine Fault Tolerant apparatus, system and method.

With reference now to FIG. 3 of the Drawings, there is illustrated therein an embodiment for practicing the principles of the present invention, which operates within a distributed ledger network 101, itself contained within a distributed communications network, generally designated by the reference numeral 100. As shown in FIG. 3, the user 110 uses client device 115 to initiate a transaction with the distributed ledger object router 200, itself contained within the full node 105 initially receiving the transaction, said full node 105 contained within the larger distributed ledger network 101, said distributed ledger network contained within or otherwise connected to the user's 110 network 100. In the present example, the distributed ledger object router 200 communicates directly with a validator node 300 provided in its full node 105, and also with one or more other object routers 201 each contained within its own full node 106. In preferred embodiments, each validator node 300, 301 is only able to communicate with its associated object router 200, 201. Such limited communication channels enhances security by preventing potential influence or alteration of the validator node 300, 301 by third parties.

When a new transaction record is received by a distributed ledger object router 200, 201, it is initially assigned a timestamp. To minimize collisions and prevent race conditions, timestamps must be accurate across the network to a minimum of 1 microsecond or, preferably, 100 nanoseconds or less based on the time accuracy of a specific GPS/GNSS network or alternative source of timing signals. The timestamp is provided by a grandmaster time server 210 able to maintain its accuracy using network signals, including GPS signals received from one or more GPS satellites 10. The term "GPS" as used in the specification and claims in this application is defined as any geospatial positioning system (including the combined use of multiple geospatial positioning systems) such as GNSS, especially the US GPS system and other government sponsored systems such as GLO-NASS (Russia), Galileo (EU), Beidou (China), as well as commercially launched systems such as Iridium, SpaceX, or other future systems such as Amazon's Project Kuiper. Each grandmaster time server 210 in each distributed ledger object router 200 operates in the same manner. Some preferable embodiments include a physical GPS receiver locked to Universal Coordinated Time (i.e., UTC) able to receive GPS signals from the GPS satellite(s) or, in the absence of GPS satellite signals, an alternative source of UTC compatible Position, Navigation and Timing signals.

Each grandmaster time server 210 in each distributed ledger object router 200, 201 operates in the same manner. All timestamps are generated and recorded using UTC format. The use of a nanosecond scale timestamp accurate to 100 nanoseconds is most preferred, as it allows a high volume of transactions to be processed asynchronously and in time order by each distributed ledger validator node 300, 301 in the network 100. The high-precision timestamp serves multiple purposes:

1. It establishes concurrency control over all transactions entering the network by ensuring that all transactions are ultimately processed by each node in time order;
2. It enables the prevention of collisions and race conditions between transactions;
3. It allows individual nodes and the network as a whole to calculate mean, median, range, variance, standard deviations and other numerical measures related to transaction processing for purposes of performance, security and analytics;

4. It allows each node to calculate its own interval timeouts per transaction; the timeout value for each individual transaction is the same for all nodes;

5. It uses each transaction's initial timestamp as part of the transaction output in the creation of each node's immutable ledger.

Following the addition of the timestamp to the transaction record, the transaction is encrypted by an encryption service 230 that uses, as part of its operation, a physical quantum random number generator or QRNG 235 to create public encryption keys, private encryption keys, nonces and one time key pads in any combination that meet the entropy and other security requirements defined by standards that include, but are not limited to, AIS31 PTG.3. Following encryption of the transaction record, a messaging service 250 communicates the transaction record to the associated distributed ledger validator node 300.

The associated distributed ledger validator node 300 processes the transaction record as follows: It first verifies the input data 310. If the verification is successful, the node analyzes and validates the transaction logic 320 associated with the transaction.

Consensus 330 review occurs by operation of the distributed ledger object router's 200 messaging service 250 transmission of the transaction data to be validated to other full nodes 106 in the network (e.g. by selection of IP addresses from a private IP address table 255). The messaging service 250 communicates the encrypted transaction data to distributed ledger object routers 2, 3, . . . . . , N (201) for validation. Each distributed ledger object router 2, 3, . . . N (201) then communicates the validation request to its associated distributed ledger validator node 2, 3, N (301). The validator nodes each process the transaction record to validate the transaction record and return a time-sequenced, asynchronous Byzantine Fault Tolerant (taBFT) consensus 330 as to the validity of the transaction data.

If the transaction is approved by consensus, the transaction is executed and transaction data is stored in data store 340. Consensus 330 review may occur concurrently with distributed ledger validator node 300 initial validation processing of the transaction record or it may occur only after the distributed ledger validator node 300 processing has processed and validated the transaction record.

Within the distributed ledger network, a full node's 105 object router 200 can only communicate with its own validator node 300 and with other full nodes 106 in the distributed ledger network 101 via each full node's 106 object router 201. The messaging service 250 uses a messaging protocol that communicates directly and independently with the associated distributed ledger validator node 300 and the other distributed ledger object routers 201 in the distributed ledger network 101. In the case of transactions having a smaller length, such as payment transactions, the messaging service 250 may use a one time key pad to encrypt transactions the size of which is equal to or smaller than the Ethernet maximum transmission unit (MTU) size of 1500 bytes. This allows the transaction to be transmitted by the distributed ledger object router 200 as a single network layer transaction.

As part of their transaction processing workflow, each full node's 105, 106 validator node 300, 301 receiving the transaction data processes the transaction as follows: It first verifies the input data 310. If the verification is successful, the node validates the transaction logic 320 associated with the transaction. Following the validation of the transaction logic, the validator node's 300 time-sequenced, asynchronous Byzantine Fault Tolerant (taBFT) consensus logic 330 votes to either confirm or deny the transaction. If the verification of the input data 310 or the execution of the transaction logic 320 does not meet the requirements for a successful vote, the vote result is "NO". Otherwise, the vote result is "YES".

The vote result is transmitted to that ledger node's 105, 106 object router 200, 201 where it is communicated via the messaging service 250 to the other ledger nodes in the network. Once the number of "YES" votes reaches the consensus majority vote threshold for approval of the transaction (generally 51% or higher for large public blockchains and distributed ledgers having thousand of nodes and 66% or higher for smaller, private blockchains and distributed ledgers), the transaction is added to each ledger node's data store 340 as part of the immutable record of all transactions maintained separately by all ledger nodes in the network.

With further reference now to FIG. 3 of the Drawings, all nodes in the distributed ledger network 101 are required to independently receive and process each transaction, and every full node 105, 106 is required to vote on each client transaction entering the network 101.

As example and not by way of limitation, the following describes the use of the system to process a single transaction in five steps, with specific attention to the present invention's time-sequenced, asynchronous Byzantine Fault Tolerant Consensus protocol:

Step 1. Write Transaction to Working Memory

Each incoming transaction is initially written to a Transaction Working Memory which may take the form of an in-memory hash table, b-tree index, key-value structure or database table(s) where it is checked for errors related to its data and/or authenticity. Examples of data validation checks include data type, value ranges and limits, presence, uniqueness, format, length and consistency. Once written to Transaction Working Memory, the transaction is validated, executed, voted on and then persisted to immutable storage. The following schema provides an example of Transaction Working Memory:

Transaction ID: Transaction ID Hash

Timestamp: UTC accurate to 1 µs (1 microsecond)

Transaction Type: Alphanumeric value identifying the type of transaction

Transaction Input Data: Ordered list of key-value input data

Transaction Output Data: Ordered list of key-value output data

Transaction Final Vote: A boolean value or, alternatively, a 1 byte character value containing either a 0 for "No" or a 1 for "Yes"

Transaction Merkle Trie Hash: Ledger hash identifier for the completed transaction The Transaction ID's transaction ID hash is created using a quantum safe cryptographic hash algorithm such as SHA-256 as follows:

Transaction ID Hash=Hash (Timestamp+Transaction Input Data) where "+" means concatenation.

The transaction's Timestamp is the UTC timestamp assigned to the transaction data at the point in time at which the transaction data was first received by a Full Node 105 in the network, specifically by a Full Node's 105 Distributed Ledger Object Router 250. Timestamp accuracy is based on milliseconds (ms), microseconds (µs) or nanoseconds (ns). All timestamps in the network must use the same time precision.

The Transaction Input Data is a serialized, ordered list of the transaction's input data.

The Transaction Output Data is a serialized, ordered list of the completed transaction's output data.

The Transaction Final Vote is a boolean or character value containing the equivalent of a "YES" or "NO" vote, the result of the completed time-sequenced, asynchronous Byzantine Fault Tolerant (taBFT) consensus vote for the transaction.

The Transaction Merkle Trie Hash is the hash identifier for the completed transaction as it is represented in the immutable ledger.

As example, a simple two-party payment transaction can be defined using the following schema:

Transaction ID: Transaction ID hash
(e.g., Hash (Hash Timestamp+Hash (Transaction Type+ Transaction Input Data+Transaction Output Data)))
Timestamp: UTC accurate to 1 μs (1 microsecond)
Transaction Type: Alphanumeric value identifying the type of transaction (e.g., "P100" where "P"=Payment and "100"=Two-party Payment Type)
Transaction Input Data: Ordered list of input data
(e.g., User A ID| Starting Amount| User B ID| Starting Amount
Transaction Output Data: Ordered list of output data
(e.g., User A ID| Ending Amount| User B ID| Ending Amount)

Step 2. Validate Transaction Data

Each transaction's input data is validated using the following procedure:
1. The keys of the key-value pairs are checked against the transaction schema to see if the names and order of the keys match. If they do not, an error is reported, the transaction is rejected, the data source and/or user inputting the transaction is quarantined and a notification is sent to the security administrator and/or customer support log.
2. The data value associated with each key is checked against the transaction schema to determine if the data value matches the data type, range and value constraints defined in the schema. If not, the transaction is rejected and an error is reported to the data source and/or user.

Step 3. Execute Transaction Application Logic

Execute the transaction application logic associated with the transaction.

Write the executed transaction's output data to the Transaction Output Data element in Transaction Working Memory for that transaction.

Step 4. Perform Time-sequenced, Asynchronous Byzantine Fault Tolerant Consensus Voting Pending Transactions In addition to the Transaction Working Memory data structure, a separate two-dimensional data structure is used to tally the votes for each pending transaction. This Pending Transactions data structure contains a Vote Record for each node for each transaction.

Each Vote Record contains the following data elements:
Ledger Node ID
Transaction ID
Time of Vote
Vote Ledger Node ID is an unique identifier for each voting node. It may be implicitly defined using one or more metrics or methods that establishes the identity of the voting node (for example, a digital signature and/or a set of metrics based on a node's unique network "signature", response time and other unique behavioral attributes). It may also be explicitly defined using any method that enables a comparison of the incoming ledger node identifier with a pre-assigned identifier for that node such as an IP address, MAC address, public key, etc. The Ledger Node ID takes the form of a numeric or alphanumeric string.

Transaction ID is the same Transaction ID Hash created when the incoming transaction was first entered into working memory.

Time of Vote is the time the vote record is transmitted to the other nodes. The Time of Vote is both generated and recorded using UTC format accurate to within 1 microsecond.

The Vote data type, is a small, unsigned integer value (1 byte), initialized with a 0, having one of the following four states:
1. An "Absent" (Non-voting node) is recorded as a 0, meaning the vote was not received within a pre-determined Close of Vote time (Ex. Close of Vote=Timeout+100 ms) following the timeout period and is not included in the vote tally
2. A "NO" vote is recorded as a 1, meaning the transaction is not approved
3. A "YES" vote is recorded as a 2, meaning the transaction is approved
4. A "Timeout" is recorded as a 3, meaning the transaction was received following the Timeout period but not before the Close of Vote and is not included in the vote tally Calculating the Votes Immediately following the entry of a new transaction into the Transaction Working Memory data structure, a new special-purpose transaction entry will be made in the Pending Transactions data structure having the following data elements:
Ledger Node ID
Transaction ID
Timeout
Total Votes The Ledger Node ID will contain the value 1000000 to distinguish it from the individual Ledger IDs and voting results provided by each node for a given transaction.

The Transaction ID will contain the same Transaction ID Hash as the corresponding hash stored in Transaction Working Memory.

The Timeout data element will contain the sum of the transaction's initial Timestamp value as recorded in the Transaction Working Memory and the pre-defined Timeout value (Ex. 100 ms).

Total Votes will be initialized at 0 and increased by a value of 1 each time a valid new vote is recorded.

Each time a new vote is either created by a node or received from another node, the following will occur:
1. Verify the value of the Ledger Node ID
2. Verify the value of the Transaction ID
3. If the Time of Vote is less than the Timeout value for that transaction, record the "YES" as a 2 or "NO" as a 1 and increment the Total Votes by 1.
4. If the Time of Vote is greater than the Timeout value, record the vote as a "Timeout" value of 3. The vote is not added to the Total Votes and is not included in the vote tally.

At the end of the Timeout period, tally the vote for the transaction using the taBFT protocol.

If the result is "NO", insert a 0 in that transaction's Transaction Final Vote data element in Transaction Working Memory.

If the result is "YES", insert a 1 in that transaction's Transaction Final Vote data element and write the executed transaction's output data in Transaction Output Data in Transaction Working Memory.

Create Transaction Summary Hash

Create a Transaction Summary Hash from the string resulting from the concatenation of the transaction's Transaction Input Data and Transaction Output Data.

Create the Transaction Merkle Trie Hash

Create a Transaction Merkle Trie Hash from the string resulting from the concatenation of the current transaction's Transaction Summary Hash and the previous transaction's Transaction Summary Hash.

The existence of a Transaction Merkle Trie Hash in the Transaction working Memory denotes a successful vote for the transaction.

Following entry of the transaction's Transaction Merkle Trie Hash in the Transaction Working Memory, the following procedure is used to maintain the time order of all written transactions:

1. Select the smallest (i.e., oldest) Timestamp value in the Transaction Working Memory.
2. If the corresponding entry has a Transaction Merkle Trie Hash, transmit the following Transaction Working Memory data for that entry to the Write and Replicate Transaction Service and return to Step 1:
   Transaction Merkle Trie Hash
   Timestamp
   Transaction Input Data
   Transaction Output Data
3. If the entry does not have a Blockchain ID hash, take no further action on the transaction.

Step 5. Write and Replicate Transaction

The ledger node's data store 340 receives the completed transaction data provided to it by the taBFT Consensus service. A unique immutable ledger identifier for the transaction is created by the data store's 340 Write and Replicate Transaction service by prepending the previous transaction's Ledger Merkle Trie Hash to the current transaction's Transaction Merkle Trie Hash and hashing the result to create a Ledger Merkle Trie Hash for the current transaction. The schema for the new ledger record will consist of the following data:

Ledger Merkle Trie Hash
Timestamp
Transaction Input Data
Transaction Output Data Following this process, the new immutable ledger transaction record is added to the ledger's current local shard.

Once the ledger record is written, the Write and Replicate Transaction service replies to the taBFT consensus service that the transaction has been written.

Blockchain shards are identified by the Timestamp values associated with their first and last (i.e., oldest and newest) transaction. These two timestamps are concatenated and hashed. The resulting hash is the filename or table name or primary key, depending on the distributed ledger's configuration and settings, for those transactions contained in the shard.

Following the addition of a transaction record to the current shard, the record may also be replicated to special purpose databases to provide search, fraud detection, AML services, streaming analytics and directed graphs of all or part of the transactional data.

Once the Write and Replicate Transaction service replies that the transaction has been written, the associated transaction records are removed from Transaction Working Memory and Pending Transactions by the Voting service.

The present invention has application in the context of validation of Positioning, Navigation and Timing. Use of the present invention to validate one or more of the user's position, travel vector, and time queries via satellite-based full nodes 105, 106 allows the time-sequenced, asynchronous, Byzantine Fault Tolerant consensus system to provide a user with validation and a record of the user's Positioning, Navigation and/or Timing.

Accordingly, the present invention provides a system, method and apparatus for processing distributed ledger transactions using a time-sequenced, asynchronous, Byzantine Fault Tolerant (taBFT) consensus system using satellite based full nodes containing an object router and a validator node. Upon consensus approval of a transaction, the transaction data is submitted to a permanent data store.

What is claimed is:

1. A method for processing distributed ledger transactions comprising the steps of:
   initiating a distributed ledger transaction using a client device in electronic communication with a satellite-based full node having a distributed ledger object router and a distributed ledger validator node, by entering input data to generate transaction data;
   generating a timestamp for the transaction, the timestamp including timestamp data identifying a time when the transaction data was generated;
   associating the timestamp data with the transaction data;
   encrypting the transaction data and the associated timestamp data;
   transmitting the encrypted transaction data and associated timestamp data from the distributed ledger object router to the distributed ledger validator node via a validator messaging service;
   the distributed ledger validator node receiving the encrypted transaction data and associated timestamp data at the distributed ledger validator node and unencrypting the transaction data and associated timestamp data;
   the distributed ledger validator node determining the validity of the transaction according to the input data and the transaction data;
   transmitting the distributed ledger validator node determination of the validity of the transaction data to the distributed ledger object router;
   transmitting the encrypted transaction data and associated timestamp data to a plurality of one or more distributed full nodes each having a ledger validator node; and
   if the ledger validator nodes of the distributed full nodes obtain a consensus majority threshold to validate the transaction data, adding the transaction data to an immutable persistent ledger data store; and
   wherein the distributed ledger validator node processes the transaction data independently and in real time using a first-in-first-out protocol based upon the timestamp data and validates the transaction data independent of the validation determination of any other distributed ledger validator node.

2. The method of claim 1, wherein if the ledger validator nodes of the distributed full nodes obtain a consensus majority threshold to validate the transaction data, the transaction is executed.

3. The method of claim 1, wherein the distributed ledger validator node determines the validity of the transaction by verifying the transaction data and validating a transaction logic associated with the transaction.

4. The method of claim 1, wherein the distributed ledger validator node determination of the validity of the transaction data is transmitted to other full nodes via a validator messaging service.

5. The method of claim 1, wherein the distributed ledger validator node transmits the transaction data added to the immutable persistent ledger data store to the distributed ledger object router, and the distributed ledger object router transmits the transaction data to other full nodes.

6. The method of claim 1, wherein the client device is a ground-based smartphone, satphone, satphone-enabled smartphone, personal computing device, or a server computer in wired and/or wireless communication with the satellite-based full node.

7. The method of claim 1, wherein the client device is a mobile land transport, mobile water transport, aviation, or guided airborne ranged device.

8. The method of claim 1, wherein the satellite-based full node is provided in a Low Earth Orbit (LEO) satellite.

9. The method of claim 1, wherein the timestamp data has an accuracy of 1 microsecond or less.

10. The method of claim 1, wherein the transaction data is a user's positioning, navigation and/or timing.

11. A decentralized computing system for processing distributed ledger transactions comprising:
a client device having a distributed ledger transaction module to receive input data and generate transaction data, which is in electronic communication with a satellite-based distributed ledger object router having a timestamp module, an encryption module, and a communication module;
the timestamp module operating to generate a timestamp including timestamp data identifying when transaction data is generated by the distributed ledger transaction module, said timestamp data being directly derived from a GPS time signal;
the encryption module operating to encrypt transaction data associated with the transaction;
a distributed ledger validator node associated with the distributed ledger object router;
a persistent, immutable data store;
wherein when the client device receives input data and initiates a transaction and generates transaction data, the distributed ledger object router generates a timestamp including timestamp data, and encrypts transaction data, and transmits the encrypted transaction data and timestamp data to the distributed ledger validator node;
wherein the distributed ledger validator node receives the input data, the encrypted transaction data and associated timestamp data and unencrypts the transaction data;
wherein the distributed ledger validator node determines the validity of the transaction according to the input data and the transaction data;
wherein the distributed ledger validator node determination of the validity of the transaction data is transmitted to the distributed ledger object router;
wherein the transaction data is transmitted to at least one additional distributed ledger validator node directly or via at least one additional distributed ledger object router; and
wherein if the distributed ledger validator node and at least one additional distributed ledger validator node obtain a consensus majority threshold to validate the transaction data, the transaction data is added to the immutable persistent ledger data store and the transaction is executed; and
wherein the distributed ledger validator node processes the transaction data using a first-in-first-out protocol based upon the timestamp data and validates the transaction data independent of the validation determination of any other distributed ledger validator node.

12. The system of claim 11, wherein the timestamp data is derived from a GPS time signal, and the timestamp data has an accuracy of 1 microsecond or less.

13. A decentralized computing system for processing distributed ledger transactions comprising:
a client device for receiving input data to generate transaction data;
a satellite-based full node having a distributed ledger object router including a timestamp service and an encryption service and a messaging service, and a distributed ledger validator node comprising a validation module;
a data store for storing validated transaction data;
the client device receiving input data and generating transaction data associated with a distributed ledger transaction;
the client device sending the input data and transaction data to the distributed ledger object router by wired and/or wireless communications;
the timestamp module generating timestamp data identifying when the transaction data is generated;
the encryption module encrypting at least the transaction data, and optionally, the input data and timestamp data;
the messaging module transmitting the input data, transaction data, and timestamp data to the distributed ledger validator node;
wherein the validation module of the distributed ledger validator node determines the validity of the distributed ledger transaction based on received and unencrypted input data, transaction data and timestamp data and independent of any validity determinations by any other device;
the messaging module transmitting the input data, transaction data, and timestamp data to additional distributed ledger full nodes;
wherein the other full nodes have a distributed ledger validator node which makes a determination of the validity of the transaction data;
wherein the determinations of the validity of the transaction data by the other distributed ledger validator nodes is transmitted to the distributed ledger validator node via the distributed ledger object router or directly; and
wherein if the distributed ledger validator nodes obtain a consensus threshold to validate the transaction data, the transaction data is added to the data store; and
wherein the distributed ledger validator nodes process the transaction data independently and in real time using a first-in-first-out protocol based upon the timestamp data and validate the transaction data independent of the validation determination of any other distributed ledger validator node.

14. The system of claim 13, wherein the timestamp data is derived from a GPS time signal, and the timestamp data has an accuracy of 1 microsecond or less.

15. The system of claim 13 wherein the distributed ledger object router timestamp service includes an internal clock and timestamp data is hashed with the transaction data and the distributed ledger validator node validation module orders the transaction data in a first-in-first-out sequence determined from the hashed timestamp data and transaction data.

16. The system of claim 13 wherein if the distributed ledger validator nodes obtain a consensus threshold to validate the transaction data, the transaction is executed.

17. The system of claim 13, wherein the client device is a ground-based smartphone, satphone, satphone-enabled smartphone, personal computing device, or a server computer in wired and/or wireless communication with the satellite-based full node.

18. The system of claim 13, wherein the client device is a mobile land transport, mobile water transport, aviation, or guided airborne ranged device.

19. The system of claim 13, wherein the satellite-based full node is provided in a Low Earth Orbit (LEO) satellite.

20. The system of claim 13, wherein the timestamp data has an accuracy of 1 microsecond or less.

21. The system of claim 13, wherein the transaction data is a user's positioning, navigation and/or timing.

* * * * *